US011296873B2

(12) United States Patent
Destefanis et al.

(10) Patent No.: US 11,296,873 B2
(45) Date of Patent: Apr. 5, 2022

(54) METHODS AND SYSTEMS TO ESTABLISH TRUSTED PEER-TO-PEER COMMUNICATIONS BETWEEN NODES IN A BLOCKCHAIN NETWORK (71) Applicant: nChain Licensing AG, Zug (CH)

(72) Inventors: Giuseppe Destefanis, London (GB); Simone Madeo, London (GB); Patrick Motylinski, London (GB); Stephane Vincent, Luxembourg (LU)

(73) Assignee: nChain Licensing AG, Zug (CH)

( * ) Notice: Subject to any disclaimer, the term of this patent is extended or adjusted under 35 U.S.C. 154(b) by 61 days.

(21) Appl. No.: 16/620,474

(22) PCT Filed: Jun. 4, 2018

(86) PCT No.: PCT/IB2018/053977
§ 371 (c)(1),
(2) Date: Dec. 6, 2019

(87) PCT Pub. No.: WO2018/224941
PCT Pub. Date: Dec. 13, 2018

(65) Prior Publication Data
US 2020/0186336 A1 Jun. 11, 2020

(30) Foreign Application Priority Data

Jun. 7, 2017 (GB) .................................... 1709096
Jun. 7, 2017 (GB) .................................... 1709097

(51) Int. Cl.
H04L 9/08 (2006.01)
H04L 9/06 (2006.01)
(52) U.S. Cl.
CPC .......... H04L 9/0861 (2013.01); H04L 9/0637 (2013.01); H04L 9/0643 (2013.01);
(Continued)

(58) Field of Classification Search
CPC ... H04L 9/0861; H04L 9/0637; H04L 9/0643; H04L 9/0825; H04L 2209/38;
(Continued)

(56) References Cited

U.S. PATENT DOCUMENTS 7,590,236 B1    9/2009  Boneh et al.
8,108,678 B1 *  1/2012  Boyen .................. H04L 9/0847
                                                    713/176

(Continued)

FOREIGN PATENT DOCUMENTS

CN      106209369 A    12/2016
EP        3113392 A1    1/2017
WO       03017559 A2    2/2003

OTHER PUBLICATIONS

Alphageek et al., "Bitcoin Computer Science research topics," Bitcoin Forum, Feb. 4, 2014, https://bitcointalk.org/index.php?topic=448562.0, 2 pages.

(Continued)

Primary Examiner — Cheng-Feng Huang
(74) Attorney, Agent, or Firm — Davis Wright Tremaine LLP (57) ABSTRACT Methods and devices for two nodes to authenticate each other as credentialed by a group of autonomous specialized nodes, without involving the group or involving a centralized certificate manager or authenticator. The method may involve a first node and a second node using bilinear pairing operations involving their respective identifiers and secret points to derive the same session key. Provided the secret points and identifiers were obtained from the group using the group private key, the bilinear pairing operation leads to generation of the same session key at each of the two nodes, thereby authenticating their respective credentials and enabling trusted communications between the two nodes.

20 Claims, 10 Drawing Sheets (52) U.S. Cl.
CPC ........ *H04L 9/0825* (2013.01); *H04L 2209/38* (2013.01); *H04L 2209/56* (2013.01)

(58) Field of Classification Search
CPC . H04L 2209/56; H04L 9/3239; H04L 9/3066; H04L 9/3073; H04L 9/0816; G06Q 2220/00

See application file for complete search history.

(56) References Cited

U.S. PATENT DOCUMENTS

| | | | |
|---|---|---|---|
| 9,154,296 | B1 | 10/2015 | O'Connell |
| 10,069,914 | B1* | 9/2018 | Smith |
| 10,856,122 | B2* | 12/2020 | Smith ................. H04L 63/1441 |
| 2003/0081785 | A1 | 5/2003 | Boneh et al. |
| 2004/0123098 | A1 | 6/2004 | Chen et al. |
| 2004/0131191 | A1* | 7/2004 | Chen ....................... H04L 9/321 380/282 |
| 2004/0179684 | A1 | 9/2004 | Appenzeller et al. |
| 2006/0098824 | A1* | 5/2006 | Mao ........................ H04L 9/088 380/282 |
| 2007/0028114 | A1 | 2/2007 | McCullagh et al. |
| 2009/0307492 | A1* | 12/2009 | Cao ....................... H04L 9/0844 713/169 |
| 2010/0195830 | A1* | 8/2010 | Kubotera .............. H04L 9/0825 380/255 |
| 2013/0191632 | A1 | 7/2013 | Spector et al. |
| 2014/0359290 | A1* | 12/2014 | McCusker .............. H04L 9/006 713/168 |
| 2015/0106869 | A1 | 4/2015 | Cabrera et al. |
| 2015/0124963 | A1* | 5/2015 | McCusker ............ H04L 9/3073 380/46 |
| 2015/0244525 | A1* | 8/2015 | McCusker ............ H04L 9/3218 380/44 |
| 2020/0186336 | A1 | 6/2020 | Destefanis et al. |

OTHER PUBLICATIONS

Barker Brettell, "Reply to UDL's Observations on a Request for an Opinion under Section 74(A) for Patent No. EP(UK) 3465578," dated Oct. 19, 2021, 4 pages.

Barker Brettell, "We request an opinion under Section 74A . . . ," letter dated Sep. 1, 2021, 6 pages.

Barua et al., "Pairing-based Crytography," 2006, http://math.iisc.ernet.in/~imi/downloads/RBC.pdf, 44pages.

Boneh et al., "A Method for Fast Revocation of Public Key Certificates and Security Capabilities," Proceedings of the 10th USENIX Security Symposium, Aug. 13, 2001, https://pdfs.semanticscholar.org/4455/d48d5fbc13a562f3ac1c9ed224a81e08bf40.pdf?_ga=2.18125439.737597485.1503568017-555059311.1503568017, 13 pages.

Boneh et al., "Identity-Based Encryption from the Weil Pairing," SIAM Journal on Computing 32(3)1586-615,2003.

Boneh, "A conversation with Dan Boneh," DIYPlus Wiki, Aug. 1, 2016, http://diyhpl.us/wiki/transcripts/2016-july-bitcoin-developers-miners-meeting/dan-boneh/, 13 pages.

Dikshit et al., "Efficient weighted threshold ECDSA for securing bitcoin wallet," 2017 ISEA Asia Security and Privacy (ISEASP), http://ieeexplore.ieee.org/document/7976994/, Jan. 29, 2017, 10 pages.

Galindo et al., "A Killer Application for Pairings: Authenticated Key Establishment in Underwater Wireless Sensor Networks," Proceedings of the 7th International Conference on Cryptology and Network Security (CANS08), Dec. 2, 2008, 15 pages.

Garman et al., "Decentralized Anonymous Credentials," Oct. 15, 2013, https://eprint.iacr.org/2013/622.pdf, 21 pages.

Horwitz et al., "Toward Hierarchical Identity-Based Encryption," International Conference on the Theory and Applications of Cryptographic Techniques, Apr. 28, 2002, https://link.springer.com/content/pdf/10.10077%2F3-540-46035-7_31.pdf, 16 pages.

International Search Report and Written Opinion dated Aug. 21, 2018, Patent Application No. PCT/IB2018/053981, 12 pages.

International Search Report and Written Opinion dated Sep. 3, 2018, Patent Application No. PCT/IB2018/053977, 13 pages.

Nakamoto, "Bitcoin: A Peer-to-Peer Electronic Cash System," Bitcoin, Oct. 31, 2008, https://bitcoin.org/bitcoin.pdf, 9 pages.

UDL, "Observations on a Request for an Opinion under Section 74(A) for Patent No. EP(UK) 3465578," dated Oct. 5, 2021, 3 pages.

UK Commercial Search Report dated Aug. 23, 2017, Patent Application No. GB1709096.0, 9 pages.

UK Commercial Search Report dated Aug. 23, 2017, Patent Application No. GB1709097.8, 9 pages.

UK IPO Search Report dated Nov. 27, 2017, Patent Application No. GB1709096.0, 4 pages.

UK IPO Search Report dated Nov. 27, 2017, Patent Application No. GB1709097.8, 5 pages.

UK Request for an opinion under Section 74(A) and Patents Form 17 dated Sep. 7, 2021, Patent Application No. GB1709096.0, 4 pages.

* cited by examiner

METHODS AND SYSTEMS TO ESTABLISH TRUSTED PEER-TO-PEER COMMUNICATIONS BETWEEN NODES IN A BLOCKCHAIN NETWORK

This invention relates generally to blockchain transactions and more particularly to methods and devices to establish trusted peer-to-peer communications between nodes.

In this document we use the term 'blockchain' to include all forms of electronic, computer-based, distributed ledgers. These include, but are not limited to consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention.

A blockchain is a consensus-based, electronic ledger which is implemented as a computer-based decentralised, distributed system made up of blocks which in turn are made up of transactions. Each transaction (Tx) is a data structure that encodes the transfer of control of a digital asset between participants in the blockchain system, and includes at least one input and at least one output. Each block contains a hash of the previous block so that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

Network nodes that receive a new transaction will quickly try to push that transaction out to other nodes in the network. Before transmitting a new transaction to other nodes, it is "validated", meaning it is checked against a set of criteria to ensure the transaction meets the basic requirements for a proper transaction according to the applicable blockchain protocol.

In order for a transaction to be written to the blockchain, it is incorporated into a block by a node (a "miner" of "mining node") that is designed to collect transactions and form them into blocks. The miner then attempts to complete a "proof of work" with respect to the node. Miners throughout the blockchain network compete to be the first to assemble a block of transactions and complete the associated proof of work for that block. The successful miner adds its confirmed block to the blockchain and the block is propagated through the network so that other nodes that maintain a copy of the blockchain can update their records. Those nodes receiving a block also "validate" that block and all the transactions in it to ensure it complies with the formal requirements of the protocol.

One of the challenges in a decentralized peer-to-peer system is ensuring that a node can communicate with another node in the network on a trusted basis. As the network architecture of some implementations evolves some nodes may take on more specialized tasks, and other nodes may rely on those specialized nodes as sources of certain data or as performers of certain functions. If a node is going to rely on another node for information or as a legitimate source, it needs to be able to establish a trusted relationship for communicating with that node. In the case where nodes may have different roles, it would be advantageous to have a mechanism for determining and verifying a node's role. Moreover, if a node turns out to be illegitimate or malicious, it should be possible for other nodes to remember it so as to ignore future communications from such a node. In a peer-to-peer system, the challenge is to solve these problems without compromising the peer-to-peer nature of the system by imposing a central authority.

Such a solution has now been devised.

Thus, in accordance with the present invention there are provided methods and devices as defined in the appended claims.

The present application may describe and disclose methods and devices that manage the secure distribution of credentials from a group of autonomous specialized nodes to a requesting node. The secure distribution of credentials may uses secret share and a group private key that none of the nodes reconstructs or possesses. The credentials include an identifier for the requesting node and a secret point that the node assembles from portions of the secret point provided by each of a plurality of the specialized nodes, where the secret point is based on the group private key and a map-to-point hash of the requesting node's identifier. The nodes may be blockchain nodes in some implementations.

The present application may further describe and discloses methods and devices for two nodes to authenticate each other as credentialed by a group of autonomous specialized nodes, without involving the group or involving a centralized certificate manager or authenticator. The method may involve a first node and a second node using bilinear pairing operations involving their respective identifiers and secret points to derive the same key. Provided the secret points and identifiers were obtained from the group using the group private key the bilinear pairing operation leads to generation of the same key at each of the two nodes, thereby authenticating their respective credentials and enabling trusted communications between the two nodes.

In an additional or alternative aspect, the present application describes a computer-implemented method for a node to obtain a credential from a group of specialized nodes, each of the specialized nodes having a private key share of a group private key. The method may include sending a request, from the node to a plurality of the specialized nodes, for the credential, wherein the node has an identifier; receiving, from each node in the plurality of the specialized nodes, a portion of a secret point generated by that node from the identifier and that node's private key share; and generating the secret point by combining the received portions of the secret point, and wherein the secret point is the group private key times a map-to-point hash of the identifier, and the credential is the identifier and the secret point. None of the specialized nodes nor the node may be required to obtain a complete copy of the group private key.

In some implementations, sending the request includes sending a separate request to each of the plurality of the specialized nodes. The identifier may include an identifier string identifying the node and a role string identifying the role of the group of specialized nodes. In some cases, the identifier further includes an expiration time for the credential, and in some further cases sending a request includes sending the identifier string, and wherein receiving includes receiving the identifier.

In some implementations, generating the secret point involves combining the received portions of the secret point. Combining may include summing in some example implementations.

In some implementations, the secret point is generated using secret share and is based on the group private key. In some of those cases, secret share uses Lagrange interpolation and the private key shares of the plurality of the specialized nodes without reconstructing the group private key.

In an additional or alternative aspect, the present application may describe a computer-implemented method for a first node to establish a trusted communication with a second node, the second node having a second node identifier and a second secret point, the second secret point being a group private key times a map-to-point hash of the second node identifier, the group private key being associated with a group of nodes configured to grant credentials. The method may include obtaining a first secret point from the group of nodes, wherein the first secret point is the group private key times a map-to-point hash of a first node identifier; sending the first node identifier to the second node; receiving the second node identifier; generating a first session key using a bilinear pairing operation with a map-to-point hash of the second node identifier and with the first secret point; and confirming that the first session key matches a second session key generated by the second node using the bilinear pairing operation with the second secret point and with a map-to-point hash of the first node identifier.

In some implementations, the bilinear pairing operation to generate first session key may be characterized by one of the expressions:

$$K_A = e(H_1(id_B), s_A), \text{ and}$$

$$K_A = e(s_B, H_1(id_A)),$$

and the bilinear pairing operation to generate the second session key is characterized by the other of the expressions, and in which e( ) is the bilinear pairing operation, $H_1$( ) is the map-to-point hash, $id_A$ and $id_B$ are each one of the first node identifier and the second node identifier, and $s_A$ and $s_B$ are each one of the first secret point and the second secret point.

In some implementations, obtaining the first secret point includes obtaining, from each of a plurality of nodes in the group of nodes, respective portions of the first secret point and combining the respective portions to form the first secret point without reconstructing the group private key.

In some implementations, confirming includes sending a challenge from the first node to the second node encrypted with the first session key, receiving a response to the challenge, and, based on the response, determining that the second node validly decrypted the challenge using the second session key.

In some implementations, sending further includes sending a first nonce, and wherein receiving further includes receiving a second nonce and a calculated $C_0$ value, wherein the $C_0$ value comprises a hash of a concatenation of the second session key, the first nonce, and the second nonce. In some of those cases, the concatenation further includes the first node identifier and the second node identifier. In some of those cases, generating includes generating a calculated $C_1$ value that comprises the hash of a concatenation of the first session key, the first nonce, and the second nonce, and wherein confirming comprises confirming that the calculated $C_0$ value matches the calculated $C_1$ value.

In some implementations, the second secret point is the group private key times the map-to-point hash of the second node identifier.

In some implementations, the first secret point and the second secret point are each provided by the group of nodes to the first node and second node, respectively, using secret sharing.

In an additional or alternative aspect, the present application may describe a node that includes one or more processors, memory, a network interface, and an application that includes processor-executable instructions that, when executed, cause the node to carry out the operations of one or more of the methods described herein.

In an additional or alternative aspect, the present application may describe a non-transitory processor-readable medium storing processor-executable instructions that, when executed by one or more processors, cause the one or more processors to carry out the operations of one or more of the methods described herein.

These and other aspects of the present invention will be apparent from and elucidated with reference to, the embodiment described herein. An embodiment of the present invention will now be described, by way of example only, and with reference to the accompanying drawings, in which:

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Although examples described below make reference to implementation in the context of a blockchain network, it will be appreciated that the present application is not necessarily limited to blockchain nodes or implementation in blockchain networks.

Figure 1:
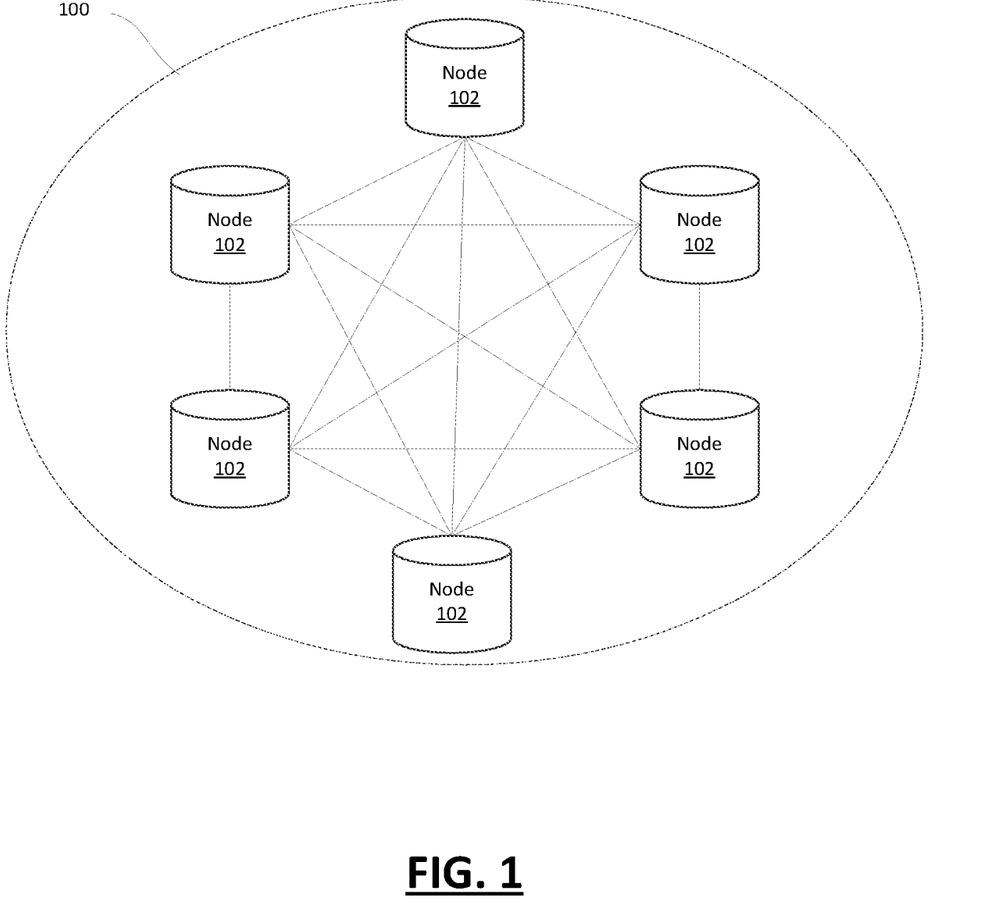
FIG. 1 illustrates an example network of blockchain nodes.

Reference will first be made to FIG. 1 which illustrates, in block diagram form, an example network associated with a blockchain, which may be referred to herein as a blockchain network 100. The blockchain network 100 is a peer-to-peer open membership network which may be joined by anyone, without invitation or without consent from other members. Distributed electronic devices running an instance of the blockchain protocol under which the blockchain network 100 operates may participate in the blockchain network 100. Such distributed electronic devices may be referred to as nodes 102. The blockchain protocol may be a Bitcoin protocol, or other cryptocurrency, for example.

The electronic devices that run the blockchain protocol and that form the nodes 102 of the blockchain network 100 may be of various types including, for example, computers such as desktop computers, laptop computers, tablet computers, servers, mobile devices such a smartphones, wearable computers such as smart watches or other electronic devices.

Nodes 102 of the blockchain network 100 are coupled to one another using suitable communication technologies which may include wired and wireless communication technologies. In many cases, the blockchain network 100 is implemented at least partly over the Internet, and some of the nodes 102 may be located in geographically dispersed locations.

Nodes 102 maintain a global ledger of all transactions on the blockchain, grouped into blocks each of which contains a hash of the previous block in the chain. The global ledger is a distributed ledger and each node 102 may store a complete copy or a partial copy of the global ledger. Transactions by a node 102 affecting the global ledger are verified by other nodes 102 so that the validity of the global ledger is maintained. The details of implementing and operating a blockchain network, such as one using the Bitcoin protocol, will be appreciated by those ordinarily skilled in the art.

Each transaction typically has one or more inputs and one or more outputs. Scripts embedded into the inputs and outputs specify how and by whom the outputs of the transactions can be accessed. The output of a transaction may be an address to which value is transferred as a result of the transaction. That value is then associated with that output address as an unspent transaction output (UTXO). A subsequent transaction may then reference that address as an input in order to spend or disperse that value.

Nodes 102 may be of different types or categories, depending on their functionality. It has been suggested that there are four basic functions associated with a node 102: wallet, mining, full blockchain maintenance, and network routing. There may be variations of these functions. Nodes 102 may have more than one of the functions. For example, a "full node" offers all four functions. A lightweight node, such as may be implemented in a digital wallet, for example, and may feature only wallet and network routing functions. Rather than storing the full blockchain, the digital wallet may keep track of block headers, which serve as indexes when querying blocks.

As noted above, mining nodes ("miners") compete in a race to create the next block in the blockchain. To assemble a block, a miner will build the block as a set of transactions from the pool of unconfirmed transactions (the "mempool"). It then attempts to complete a proof of work with respect to the block it has assembled. If it manages to complete the proof of work prior to receiving notice that any other miner has succeeded in generating a block and completing its proof of work, then the miner propagates its block by sending it to peer nodes on the network. Those nodes validate the block and then send it further on in the network to other nodes. If the miner receives notice that another block has been completed prior to finishing its own proof of work, then the miner abandons its efforts and begins trying to build the next block. Fast propagation of blocks helps avoid wasted effort on behalf of miners and validating nodes.

In current implementations of blockchain, such as the Bitcoin network, each node that receives a block first validates the block before sending it to other nodes. The time taken to validate a block slows propagation of the block through the network. Note that some implementations of blockchain, including evolutions of existing protocols, may provide for block validation by only a subset of nodes rather than each node in the network; however, block validation at most nodes is still likely to be a feature of any blockchain implementation to prevent invalid blocks from propagating through the network.

Validating a block involves confirming that the block meets prescribed criteria set by the applicable blockchain protocol. Example criteria applicable to the Bitcoin protocol are defined in the Bitcoin Core client functions CheckBlock and CheckBlockHeader. In addition to confirming that the block itself conforms to prescribed criteria, each transaction within the block may be assessed for compliance with transaction-level criteria. As an example, the transaction-level criteria applied in the Bitcoin protocol may be seen in detail in the functions AcceptToMemoryPool, CheckTransaction and CheckInputs.

In general, transaction-level validation criteria are those prescribed characteristics which a transaction must have to be considered valid under the applicable blockchain protocol. Similarly, the block-level validation criteria are those prescribed characteristics which a block must have to be considered valid under the applicable blockchain protocol.

Some evolutions of the blockchain may provide for further specialized nodes. As an example, there may be nodes that are structured as storage nodes with large quantities of fast access memory and significant network communication resources. The storage nodes may implement a distributed transaction database storing unconfirmed transactions (the "mempool"). In some implementations, the storage nodes may implement a distributed UTXO database for unspent transaction outputs. These distributed databases may be implemented by way of distributed hash table in some cases. As another example, some nodes may be structured as validator nodes designed to focus on fast validation and propagation of transactions. The validator nodes and the storage nodes may facilitate the increased transaction volume associated with large scale payment processing by forming a fast-transaction merchant network within the blockchain network 100, designed for distributed large volume storage and for quickly validating and propagating transactions.

A significant growth in the number of transactions coming from use in payment processing would increase the volume of transactions to store in each mempool. Assuming an average size of a transaction (TX) of 500 bytes and a transaction rate of $\sim 10^4$ TX/s, the mempool may receive ~400 GB of daily incoming data. All of this data needs to be stored for varying amounts of time in a mempool of unconfirmed transactions. Accordingly, in some implementations a network of nodes may use a shared mempool implemented by way of a Distributed Hash Table (DHT) in order to store the pool of unconfirmed transactions, rather than storing a complete mempool at each node. In such an implementation, mining nodes and/or some other types of nodes may not necessarily maintain a full mempool locally so as to relieve them of the burden of storing and updating a very large pool of unconfirmed transactions. Instead, the mining nodes and/or other types of specialized nodes may rely on the network of storage and or validator nodes to manage the maintenance of the mempool. In some examples below, the term specialized node may be used to refer to a node that has a particular role in the blockchain network, such as a validator node, a storage node, or the like.

Figure 2:
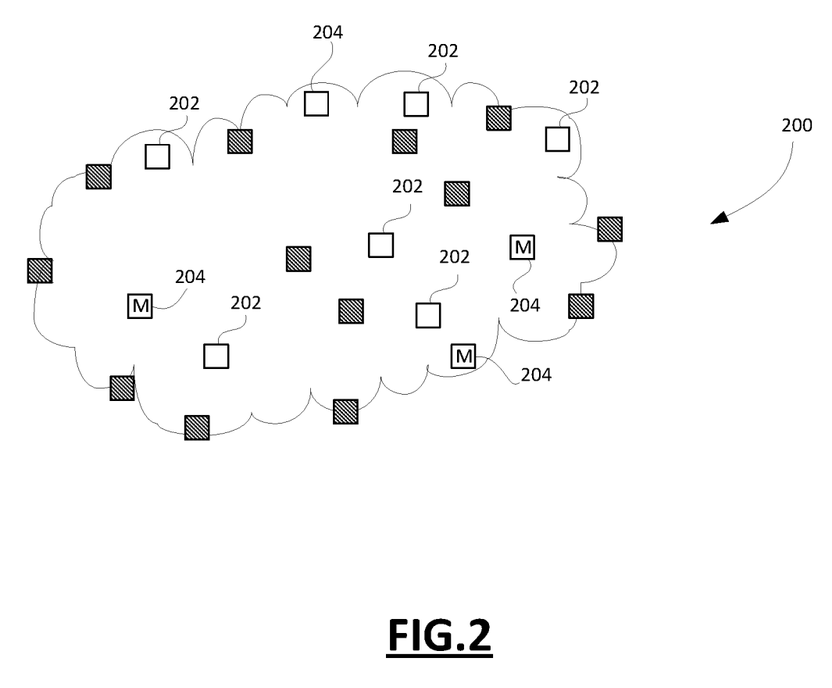
FIG. 2 shows an example blockchain network containing specialized nodes.

Reference is now made to FIG. 2, which shows one example implementation of a blockchain network 200 of nodes. The blockchain network 200 includes a plurality of specialized nodes 202 and a plurality of mining nodes 204. The specialized nodes 202, in this example, are physically and logically distributed throughout the network 200. It will be understood that the blockchain network 200 may include a number of other types of nodes, including full nodes, simplified payment verification (SPV) nodes (e.g. wallets), and other specialized nodes having a focused role.

Figure 3:
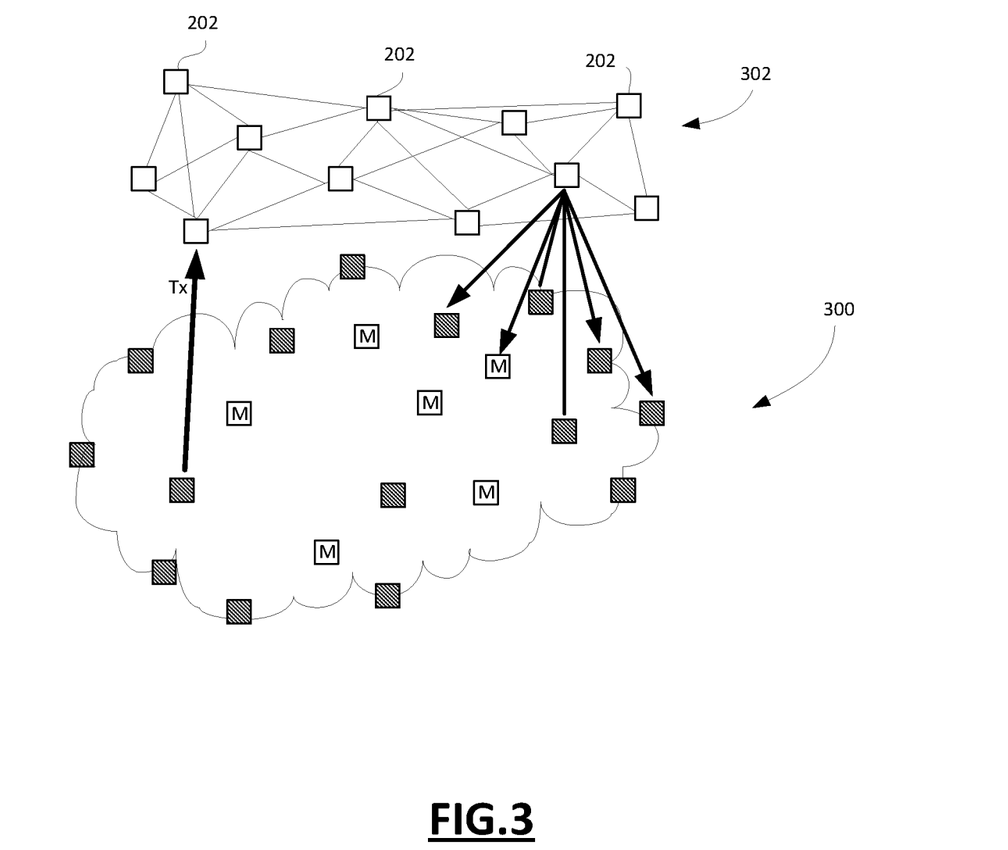
FIG. 3 shows an example blockchain network in which the specialized nodes form an overlay network.

Another example implementation of a blockchain network 300 is illustrated in FIG. 3, which shows the specialized nodes 202 form a (logical) overlay network 302 within the blockchain network 300. The overlay network 302 may be configured to ensure fast communication between specialized nodes 202 within the overlay network 302 to ensure speedy access and retrieval from the shared mempool.

The specialized nodes 202 in this example may be implemented to facilitate fast transaction validation and propagation as part of a structure to facilitate large volume payment processing through the blockchain network 200, 300. In this regard, the specialized nodes 202 may be validator nodes that focus on transaction validation and propagation and the mining nodes 204 focus on block mining, and are relieved of the need to store the mempool or validate transactions. In this example, the specialized nodes 202 may have access to the mempool directly in that they participate in its DHT-based storage, or may have access to the mempool via one or more storage nodes.

This restructuring of the blockchain network 200, 300 and the roles of individual nodes so as to encourage fast transaction processing may create challenges in ensuring growth of the blockchain and non-malicious participation of the various nodes. It is highly important to maintain the decentralized nature of the blockchain network 200, 300 by avoiding imposing control by one or more central authorities. For the network 200, 300 to function properly, the mining nodes 204, specialized nodes 202 and other specialized nodes are to interact in a manner that ensures that each node performs its own function or role reliably and that it can trust other nodes will perform their functions or roles reliably. To this end, the interaction between specialized nodes 202 and mining nodes 204 may use a plurality of transactions that facilitate cooperation in pursuing the fast mining and propagation of blocks.

Figure 4:
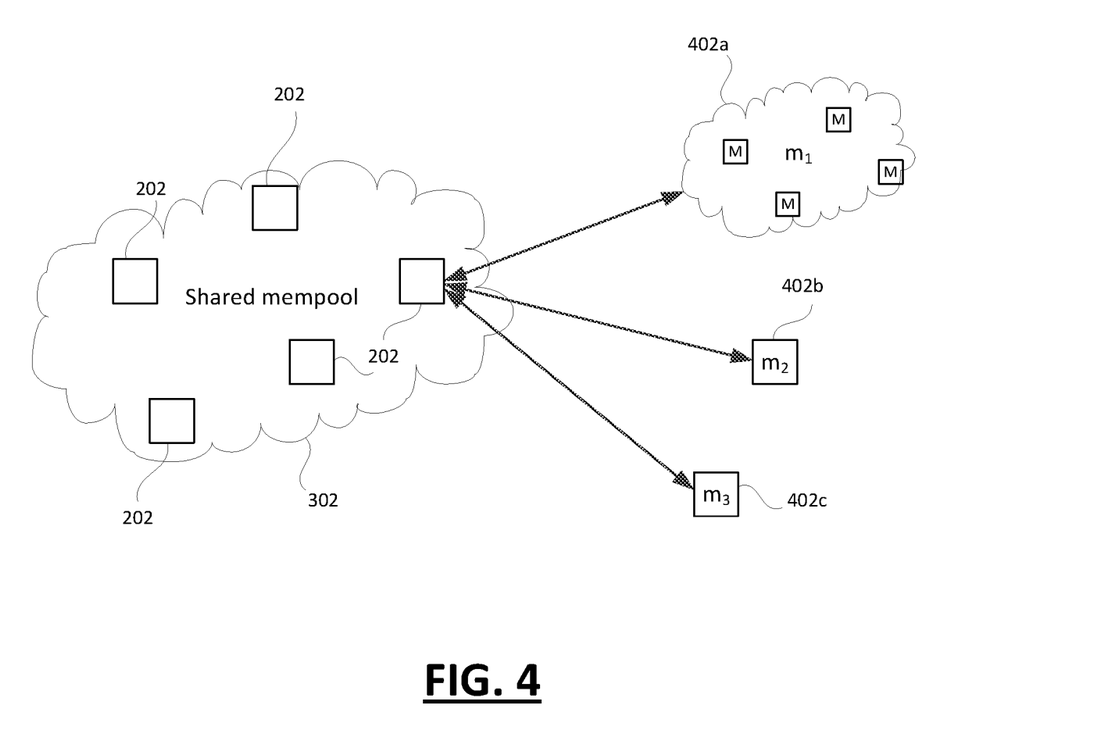
FIG. 4 diagrammatically illustrates a network of specialized blockchain nodes interacting with mining nodes.

Reference is now made to FIG. 4, which diagrammatically shows a plurality of mining nodes 402 (shown individually as 402a, 402b, 402c) and the overlay network 302 containing a plurality of specialized nodes 202. In this example, the specialized nodes 202 implement the mempool as a shared mempool using, for example, DHT to store the large database of unconfirmed transactions in a distributed manner among the specialized nodes 202. However, this is one example implementation and in some other implementations each specialized node 202 may store a full copy of the mempool.

The mining nodes 402 may include individual solo miners like those indicated by reference numerals 402b and 402c, and may include a mining pool containing multiple miners, such as that indicated by reference numeral 402a.

The mining nodes 402 in this example do not have a full copy of the mempool and rely on the specialized nodes 202 to provide them with the material needed to mine new blocks. In particular, one of the specialized nodes 202 may invite the mining nodes 402 to participate in mining a new block using a set of unconfirmed transactions that the specialized node 202 has access to in the mempool. The mining nodes 402 may choose to agree to participate in the mining activity by receiving the set of new unconfirmed transactions. In exchange for receiving a deposit from each mining node 402, the specialized node 202 provides each of them with the set of transactions (or a hash of the set of transactions). If one of the participating mining nodes 402 is successful in creating a new block from the set of transactions, then that mining node 402 receives a refund of its deposit from the specialized node 202 in addition to the normal fees for mining a block. The other unsuccessful mining nodes 402 forfeit their deposits to the specialized node 202. If none of the participating mining nodes 402 succeed in creating the next block, then the specialized node 202 refunds their deposits less a validation fee that is collected by the specialized node 202 in part as compensation for its efforts in validating transactions and providing the set of validated transactions to the mining nodes.

However, the mining nodes 402, in this example, will want to be able to authenticate that the specialized node 202 is legitimately a member of the pool of specialized nodes. Likewise, among the specialized nodes 202 themselves, they may need to authenticate the identity of one of the specialized nodes 202 and the authority of that node to participate in collaborative work. In many network architectures, this function is realized by imposing a central authentication service, such as a certificate authority or the like, that centrally manages credentials and authenticates participating nodes. But such an architecture is undesirable in a distributed peer-to-peer architecture, where central control or authority is to be avoided.

The same issue may arise in other portions of the blockchain network as its architecture evolves to accommodate nodes that have specialized roles, whether for validation, storage, mining, or other functions. Those nodes serve as members of a group having a specific role, and other members of that group with that role will want to be able to identify and authenticate membership in the group. Similarly, nodes that are not members of the group but that interact with and need to "trust" a specialized node in the group will want to be able to authenticate that node's membership in the group. It would be desirable to enable nodes to authenticate identity and membership without imposing a centralized certificate authority on the decentralized blockchain network.

In one aspect, the present application provides a method and devices for credentialing a node in reliance upon distributed private key shares among a group of nodes that are members of a specialized node group. Accordingly, the credentials are generated and provided to the requesting node through collaboration of the specialized nodes in the group and in such a way that none of the specialized nodes alone could provide valid credentials to a requesting node.

In another aspect, the present application provides a method of establishing a trusted communication channel between two nodes through confirming that each node is in possession of credentials granted by the same group of nodes. The nodes involved in the trusted communication channel may both be members of the group that granted the credentials, but are not necessarily members. In one example, one of the nodes is a member of the group of specialized nodes and the other node is not. Confirming the validity of the credentials of the two nodes may be based on each node generating a key using a bilinear pairing operation and ensuring that the keys match. The bilinear pairing operation for one of the nodes may include, as arguments, a map-to-point hash of an identifier for the other node and a secret point collaboratively generated and provided to the one of the nodes by the group of nodes.

Figure 5:
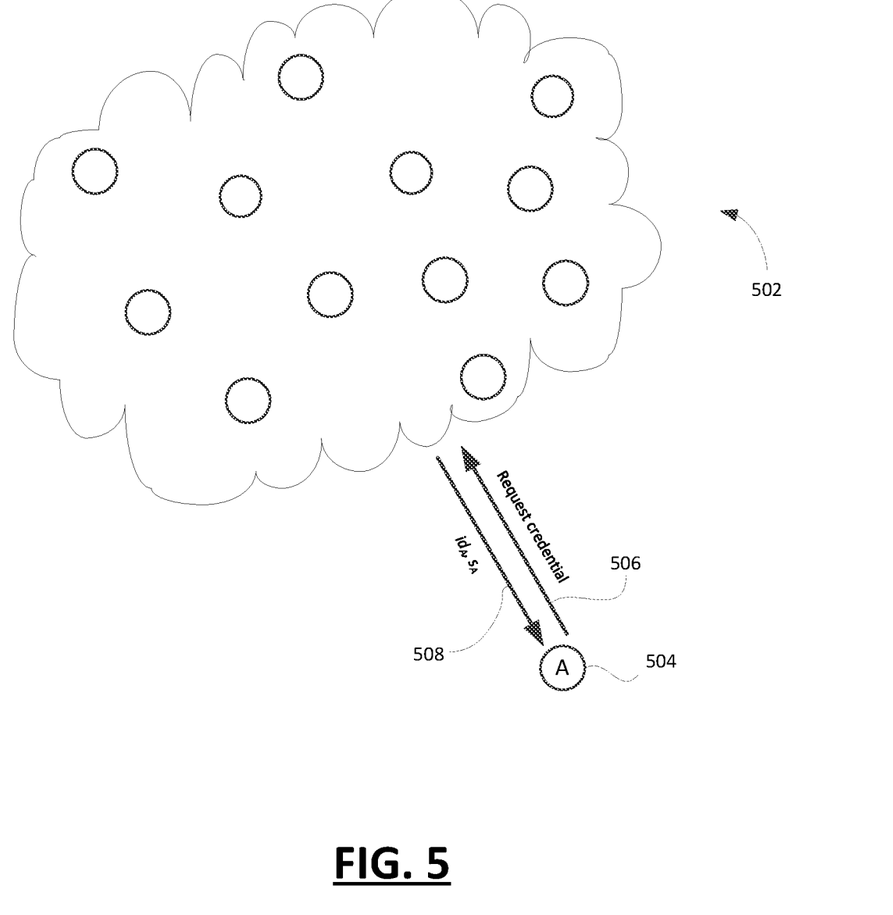
FIG. 5 diagrammatically shows a blockchain node requesting credentials from a group or network of specialized blockchain nodes.

Reference is now made to FIG. 5, which diagrammatically shows a group of specialized nodes 502. A requesting node 504 wishes to obtain credentials from the group of specialized nodes 502 so as to be able to prove its identity as one of the specialized nodes or as a node communicating with one of the specialized nodes. The requesting node 504 may or may not be part of the group of specialized nodes 502.

The requesting node 504 sends a request 506 for credentials to the group of nodes 502. The request 506 is associated with an identifier for the requesting node 504. The identifier may be generated by the requesting node 504 and sent with the request 506 in some implementations. For example the requesting node 504 may generate its identifier "Alice" and tell the group of nodes 502 that its id=Alice. In some implementations, the identifier may be assigned by the group of node 502 or, more particularly, by one of the nodes in the group of nodes 502 and communicated to the requesting node 504. In some implementations, the requesting node 504 provides the group of nodes 502 with its "name" or identifier string, e.g. "Alice", which may be any alphanumeric string or other unique identifier. The group of nodes 502 may concatenate additional information to the identifier string to generate the identifier for the requesting node 504. For example, the group of nodes 502 may combine the identifier string with a name or identifier for the group of nodes 502. In some implementations, the name is the "role" or function of the group of nodes 502, such as "validator" or the like. In some implementations, the group of nodes 502 may combine the identifier string with an expiration time for the credentials so that any other node evaluating the requesting node's 504 credentials can assess from its identifier whether the credentials remain unexpired. In one example implementation illustrated below, the identifier for the requesting node 504 is formed from the concatenation of the identifier string (e.g. Alice), a role string that identifies the group of nodes 502 or their functional role, and the expiration time of the certificate. Other possible implementations of the identifier will be appreciated by those ordinarily skilled in the art.

Each node in the group of nodes 502 includes a share $k_i$ of a private key k. Secret sharing is used in threshold cryptosystems where a secret k is divided among n players, such that at least t+1 participants are required to collaborate in order to reconstruct k. The knowledge of any t pieces of the secret k leaves the latter undetermined.

Secret sharing is based on polynomial interpolation and the secret is assumed to be an element of a finite field F. The scheme comprises a dealer (dealerless versions also exist), a set of n participants $U_1, \ldots, U_n$. In the protocol, an arbitrary random secret is stored as $f(0)$ in a t degree polynomial $f(x)$ and only node i can calculate its share $f(x_i)$. If t+1 out of n nodes collaborate, they can reconstruct any point on $f(x)$, with their shares (of the key k) $k_1, k_2, \ldots, k_n$ which correspond to $f(x_1), f(x_2), \ldots f(x_n)$ using Lagrange Polynomial Interpolation. Lagrange Polynomial Interpolation provides that a function $f(x)$ with degree t can be reconstructed with $$t+1 \text{ points } p = \{(x_1, f(x_1)), (x_2, f(x_2)), \ldots, (x_{t+1}, f(x_{t+1}))\}$$

-continued $$f(x) = \sum_{i \in p} f(x_i) \prod_{j \in p, j \neq i} \frac{x - x_j}{x_i - x_j} = \sum_{i \in p} f(x_i) b_{i,p}(x)$$

where $$b_{i,p}(x) = \prod_{j \in p, j \neq i} \frac{x - x_j}{x_i - x_j}$$

Note that: $b_{i,p}(x_i)=1$ and $b_{i,p}(x_j)=0$. In this respect, $b_i$ are interpolation coefficients.

In an implementation involving dealerless shares distribution:
1. Each node i is assigned $x_i$ which is known by everyone. Each $x_i$ has to be unique.
2. Each node i generates a random polynomial $f_i(x)$ with degree t.
3. Each node i secretly sends (encrypted with the recipients' public key) every other node their respective point on the polynomial, $f_i(x_j)$ mod n.
4. Each node i sums all their received $f_1(x_i), f_2(x_i), \ldots f_p(x_i)$, all mod n, (wherein n is the characteristic of the base field $\mathbb{F}_n$ ($\mathbb{F}_n$ can also denoted GF(n), $\mathbb{Z}/n\mathbb{Z}$)) to form $k_i=f(x_i)$ mod n which is a share on the polynomial $f(x)$ mod n.

Returning to the example of FIG. 5, the nodes of the group of nodes 502 collaborate to generate a secret point $s_A$ for the requesting node 504, as indicated by reference numeral 508. The secret point $s_A$ is in the cyclic group $G_1$, the significance of which will become clear from the explanation below regarding handshakes and pairing. The secret point is related to the identifier as:

$$s_A = k \cdot H_1(id_A)$$

where $id_A$ is the identifier for the requesting node 504. The credential may be considered to be $(id_A, s_A)$ in some implementations. $H_1$ is a map-to-point hash function, as will be explained in greater detail below.

Figure 6:
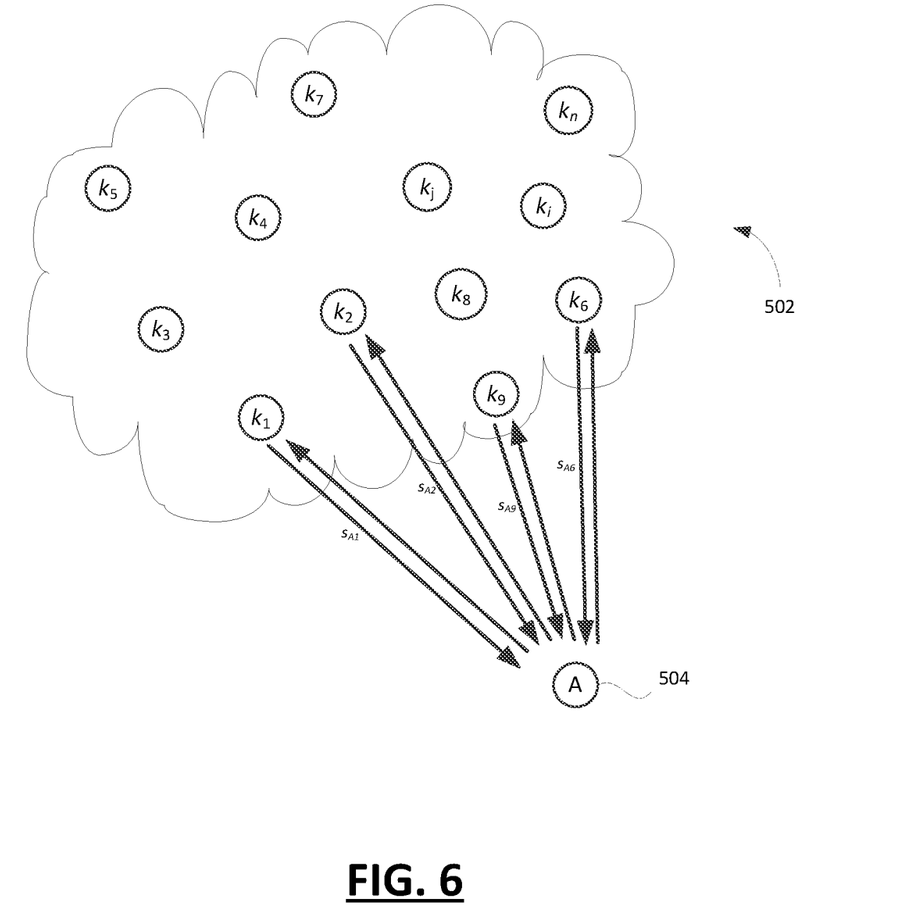
FIG. 6 diagrammatically shows an example implementation of the blockchain node obtaining partial credentials from the group of specialized blockchain nodes.

In order to generate the secret point without reconstructing the group private key k, the group of nodes 502 collaborate in generating $s_A$ using a form of Secret Share Joining. FIG. 6 shows another example of the group of nodes 502 granting credentials to the requesting node 504. In this illustration, the requesting node 504 sends a credential request to at least t+1 nodes of the group of nodes 502. Those nodes each provide the requesting node 504 with a portion of $s_A$. In particular, each share $s_{Ai}$ of the secret point $s_A$ is determined by node i and sent to the requesting node 504, and the requesting node 504 then assembles them (i.e. combines them) into the secret point $s_A$. In some examples, the shares $s_{Ai}$ are combined by summing them to obtain the secret point $s_A$.

Figure 7:
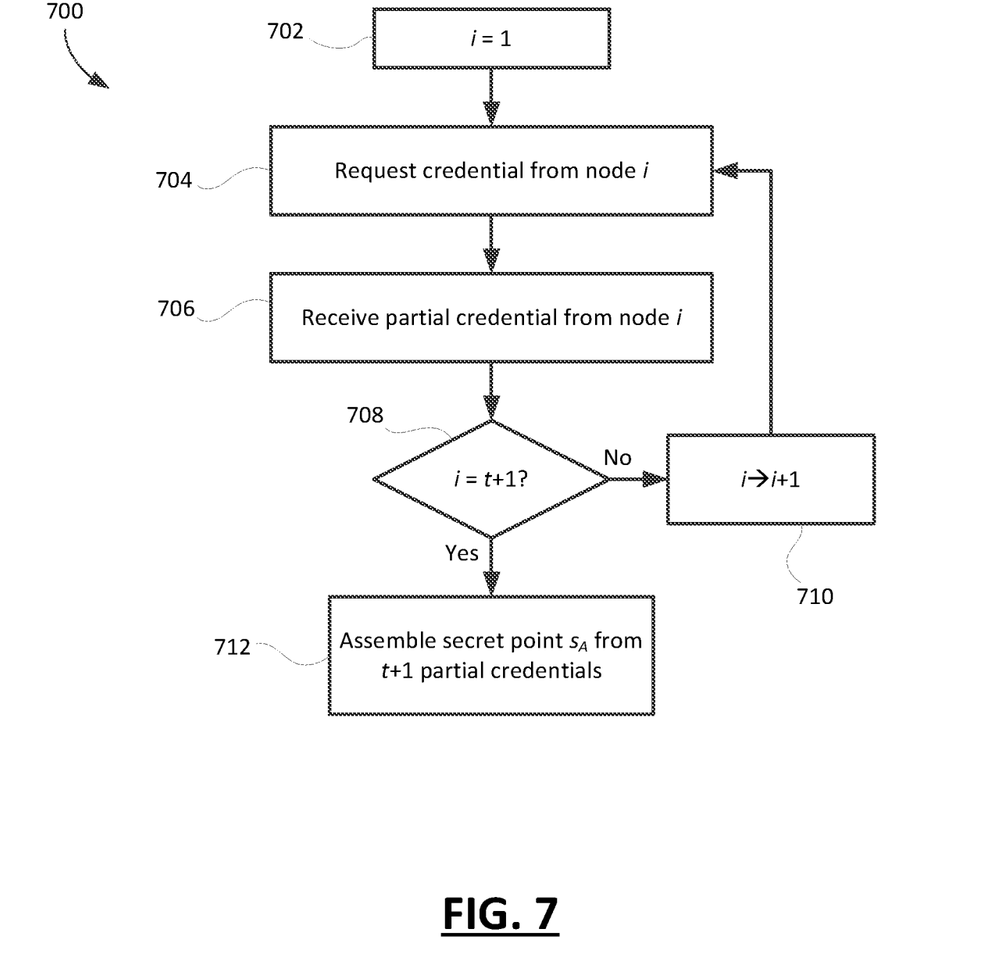
FIG. 7 shows, in flowchart form, one example process for obtaining credentials from a group of blockchain nodes.

Reference is now made to FIG. 7, which shows, in flowchart form, one example process 700 for group-based distributed generation of credentials. The process 700 is carried out by a requesting node. It begins with the requesting node setting an index i to 1 in operation 702. The requesting node then requests credentials from a node i. The node i is a specialized node in a group of nodes configured to carry out an implementation of the credential granting procedure described herein. The node i determines, using portion of the group private key share $k_i$, an $i^{th}$ portion of the secret point $s_A$. That portion may be referenced as $s_{Ai}$.

In operation 706, the requesting node receives the portion $s_{Ai}$ from the $i_{th}$ node, i.e. it receives a partial credential. In operation 708, the receiving node assesses whether index i is t+1. If so, then the receiving node has received t+1 partial credentials, but if not, then it still requires additional partial credentials to reconstruct the secret point $s_A$. If i is not yet equal to t+1, then in operation 710 it is incremented by 1 and the process 700 returns to operation 704 to request a further partial credential from the another node in the group of 5 nodes. If i is equal to t+1, then in operation 712 the requesting node assembles the secret point $s_A$.

Having obtained credentials through the collaborative efforts of the nodes in the group of nodes, it would be advantageous to have a mechanism to check or validate credentials without relying on central authority or going back to the group for validation/authentication. In that way, two nodes that purport to have valid credentials from the same group of nodes can validate each other's credentials without the burden of time delay and communication overhead associated with having the group of nodes collaboratively verifying and validating the issued credentials.

As an overview, consider that the group private key k is a member of a finite field, i.e. $k \in \mathbb{Z}_q$. A requesting node that obtains credentials has them in the form of its identifier, $id_A$, and the secret point $s_A$ in a cyclic group $G_1$. In this example embodiment the identifier (or "pseudonym") $id_A$ is (Alice‖role‖expiration time) where ‖ denotes concatenation of two strings, and role is a string or other alphanumeric identifier associated with the group of nodes and/or its function or role. The requesting node can reveal its identifier to anyone but keeps $s_A$ secret.

Another requesting node obtains the identifier $id_B$ as (Bob‖role‖expiration time) and secret point $s_B$.

Note that the secret point $s_A$ is given by $s_A = k \cdot H_1(id_A)$ and secret point $s_B$ is given by $s_B = k \cdot H_1(id_B)$.

When Alice and Bob wish to establish trusted communications with each other, i.e. one or both of them wishes to verify the credentials of the other, the two nodes exchange their respective identifiers/pseudonyms without disclosing their secret points.

The node Alice then generates a session key $K_A$ by computing:

$$K_A = e(H_1(\text{Bob}\|\text{role}\|\text{expiration time}), s_A)$$

where e( ) is a bilinear map, i.e. a pairing operation, and node Bob calculates a session key $K_B$ by computing:

$$K_B = e(s_B, H_1(\text{Alice}\|\text{role}\|\text{expiration time}))$$

The operation $H_1( )$ is a map-to-point function, as will be described further below. Due to the properties of pairings, the two keys are the same, i.e. $K_A = K_B$. By sending a challenge value and getting a response for it, the two nodes can verify that the protocol succeeded, i.e. that the two nodes each hold credentials issued by the same group of nodes indicating the same role. Alternatively, one party can send to the other some content, which will be successfully decrypted if and only if the handshake succeeded.

The pairing operation in this example relies on $s_A$ and $s_B$ being from the same cyclic group $G_1$ in this case. In other cases, the two may be from different cyclic groups G1 and G2 that are related as two abelian groups that take values in another abelian group as:

$$e: G_1 \times G_2 \rightarrow G_T$$

where $G_1$, $G_2$, and $G_T$ are cyclic groups of the same order.

There are certain parameters in the generation of the credentials that are public. They may be generated by any node in the process and shared with the other nodes. Starting from the assumption that E is an elliptic curve containing n points over a field $\mathbb{F}_q$, where q is a power of a prime relatively prime to 2 and 3, the public parameters may include the following:

$$\text{params} = (p, G_1, G_2, G_T, g_1, g_2, e, H_1, H_2)$$

where $g_1$ (resp. $g_2$) is a generator of the group $G_1$ (resp. $G_2$) of prime order p that has a bilinear map e(.,.). $G_1$ is a cyclic subgroup of $E(\mathbb{F}_q)$ of order r with r, q coprime. And, $e(g_1, g_2)$ generates $G_T$ which also has order p. $H_1$ and $H_2$ are map-to-point hashes with respect to $G_1$ and $G_2$, respectively. As noted above, in some implementations, and in many of the examples described herein, only $G_1$ might be used, meaning the same map-to-point hash function, $H_1$, is used for both secret points $s_A$ and $s_B$.

In some elliptic curve cryptosystems, a hash algorithm is used to map a password or other string, which is an element of a finite field, into a point of a given elliptic curve These are map-to-point hashes. More precisely, a map-to-point hash function $H_1$ is a transformation that takes an input a message m and returns a point $P \in E(K)$. More particularly, $H_1$ returns the point $P \in E(K)[r]$, where $E(K)[r]$ is the subgroup of $E(K)$ generated by $G_1$. In this scheme, there exists a one-to-one mapping $f$ from a base field $\mathbb{F}_q$ to the curve. This enables to hash using $f(H(m))$ where H is a classical hash function and $H(m) \in \mathbb{F}_q$.

Figure 8:
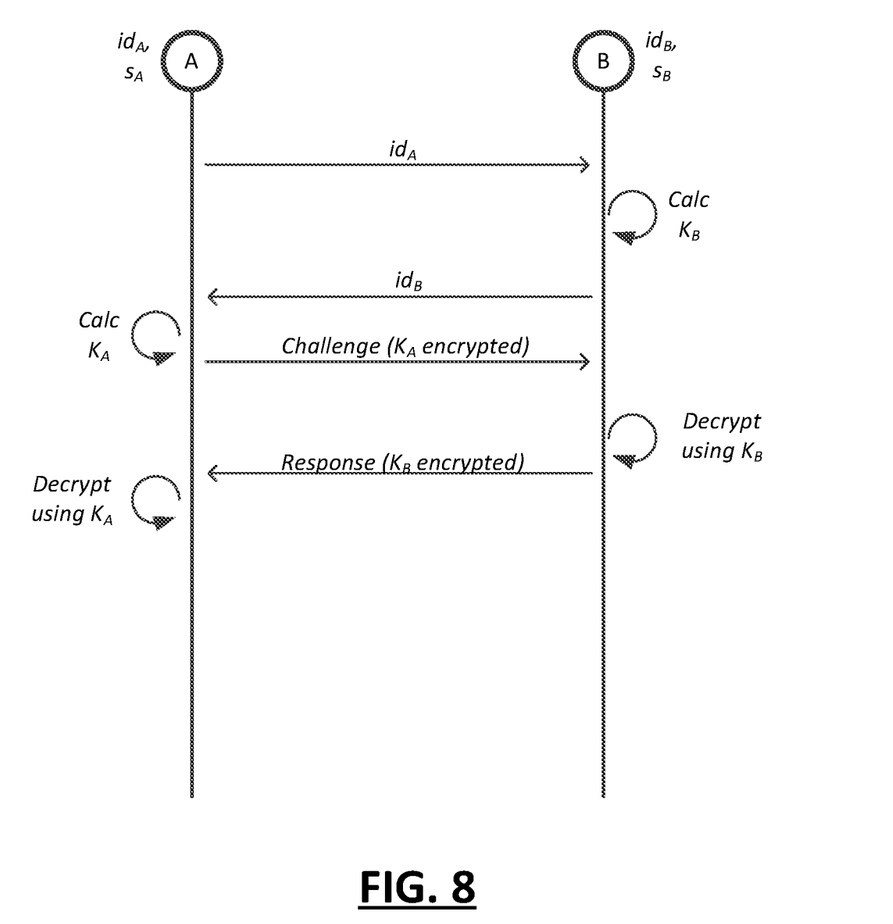
FIG. 8 is a diagram illustrating an example process of two blockchain nodes authenticating each others' credentials obtained from a group of specialized blockchain nodes.

Reference is now made to FIG. 8, which shows the message flow between two nodes, A and B in establishing a trusted communication channel by validating each others' credentials. In this example implementation, node A provides its identifier $id_A$ to node B. The identifier $id_A$ is publicly available and may be obtained by node B from another source in some cases. From this, node B is able to generate a session key $K_B$ using the identifier for node A, the secret point $s_B$ held by node B, and the map-to-point hash function $H_1$ prescribed by the group-of-nodes that issued the credentials. The session key $K_B$ is generated using the pairing operation e( ) that is also prescribed by the group of nodes:

$$K_B = e(s_B, H_1(\text{Alice}\|\text{role}\|\text{expiration time}))$$

where, in this example, node B's identifier $id_B$ is (Alice‖role‖expiration time).

Node B provides its identifier $id_B$ to node A, and node A is then able to similarly generate a session key $K_A$ using node B's identifier, its secret point $s_A$, and same the pairing operation and map-to-hash function:

$$K_A = e(H_1(\text{Bob}\|\text{role}\|\text{expiration time}), s_A)$$

If the secret points were legitimately collaboratively generated by the group of nodes using the same group private key k and the identifiers of the respective nodes A and B, then the pairing operations should result in $K_A = K_B$. This may be testing in any number of ways. In this example implementation, node A sends a challenge to node B encrypted with session key $K_A$. Node B attempts to decrypt the challenge using its session key $K_B$ and sends a response to the challenge. The response may be encrypted by session key $K_B$. On this basis both nodes can be sure that they have the same session key. That session key may be used to encrypt communications between the two nodes. In another implementation the session key may be used to encrypt communications leading to set up of another key. In yet another implementation, communications between the two nodes simply rely on the above-described procedure to validate/authenticate each others' credentials, and communications between the two nodes are either not encrypted or are encrypted using the nodes' usual public-private key pairs.

Figure 9:
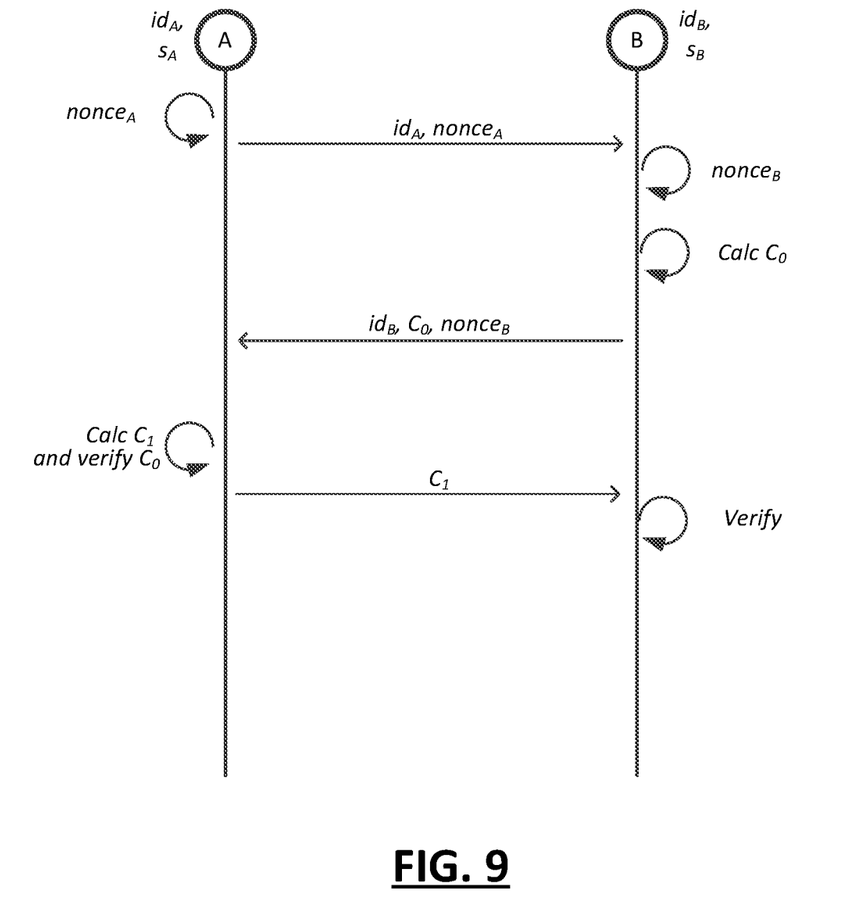
FIG. 9 is a diagram illustrating another example process of two blockchain nodes authenticating each others' credentials obtained from a group of specialized blockchain nodes.

Another example implementation is illustrated by the signal diagram of FIG. 9. In this example, node A begins by generating a random nonce, $\text{nonce}_A$. It sends its identifier $id_A$ and its nonce to node B. Node B generates its own nonce, $nonce_B$. Node B then, in this example, generates the value $C_0$, which is a hash of the result of the pairing operation and other data, including the nonces. In this example, the value $C_0$ may be given by:

$$C_0 = H(e(s_B, H_1(id_A)) \| id_A \| id_B \| nonce_A \| nonce_B)$$

where H is a collision resistant hash function from strings to strings. In one example, H is SHA-256.

Node B then replies to node A providing its identifier $id_B$, its nonce $nonce_B$ and the value $C_0$. Node A then performs a similar calculation to obtain the value $C_1$, which in this example is expressed as:

$$C_1 = H(e(H_1(id_B), s_A) \| id_A \| id_B \| nonce_A \| nonce_B)$$

It will be noted that the only difference in the arguments in the expression for $C_1$ versus $C_0$ is in the pairing operation. Accordingly, if the bilinear pairing operation confirms that the credentials of node A and node B were obtained from the same group of nodes, then the two values should match. Node A can verify that they match and, if so, sends $C_1$ to node B, which also verifies that they match. In one implementation, the values $C_0 = C_1$ are then used as the session key to encrypt communications between node A and node B. In some implementations, the nodes simply rely on their usual public key-private key pairs to encrypt communications, and the above-described operations are for authentication and not also for establishing a session key.

In some example implementations, the data or strings concatenated and hashed to form the values $C_0$ and $C_1$ may include other data or strings or may exclude some of the above example strings. For example, in one implementation the values $C_0$ and $C_1$ may not include concatenation of the identifiers $id_A$ and $id_B$. Although it will be appreciated that the hashes and nonces help protect the communication from man-in-the-middle attacks.

Figure 10:
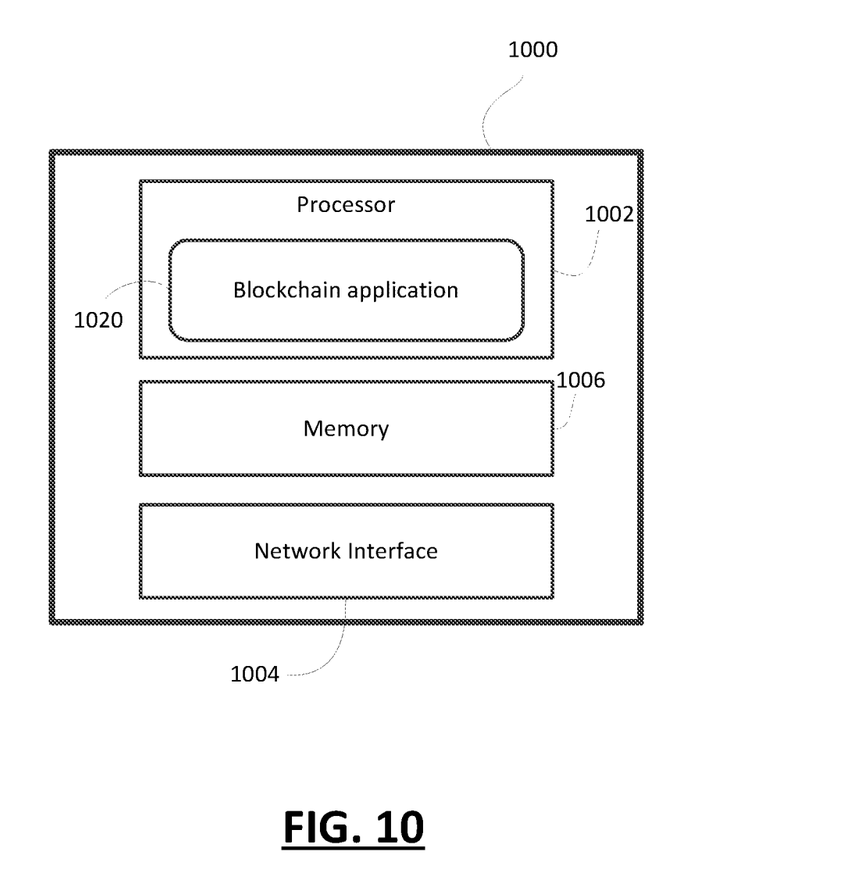
FIG. 10 is a simplified block diagram of an example blockchain node.

Reference will now be made to FIG. 10, which shows, in block diagram form, a simplified example of a blockchain node 1000. The blockchain node 1000 in this example includes a processor 1002, a network interface 1004 and memory 1006. The blockchain node 1000 may be implemented using any suitable computing hardware having network connectivity and sufficient processing and memory resources to carry out the functions described herein. The blockchain node 1000 may include processor-executable instructions to implement the functions described herein. In some cases, the processor-executable instructions may be referred to as a blockchain application 1020, although it will be appreciated that the instructions may be implemented in one or more modules, applications, scripts or other programming structures, depending on the hardware and operating system. The processor 1002 may include a multi-core processor, and/or multiple processors.

It will be understood that the devices and processes described herein and any module, routine, process, thread, application, or other software component implementing the described method/process for configuring the video feature extractor may be realized using standard computer programming techniques and languages. The present application is not limited to particular processors, computer languages, computer programming conventions, data structures, or other such implementation details.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer-implemented method for a first node to establish a trusted communication with a second node, the second node having a second node identifier and a second secret point, the second secret point being a group private key times a map-to-point hash of the second node identifier, the group private key being associated with a group of nodes configured to grant credentials, the method comprising:

obtaining a first secret point from the group of nodes by at least obtaining, from each of a plurality of nodes in the group of nodes, respective portions of the first secret point and combining the respective portions to form the first secret point without reconstructing the group private key, wherein the first secret point is the group private key times a map-to-point hash of a first node identifier;

sending the first node identifier to the second node;

receiving the second node identifier;

generating a first session key using a bilinear pairing operation with a map-to-point hash of the second node identifier and with the first secret point; and confirming that the first session key matches a second session key generated by the second node using the bilinear pairing operation with the second secret point and with a map-to-point hash of the first node identifier.

2. The method claimed in claim 1, wherein the bilinear pairing operation to generate first session key comprises one of the expressions:

$$K_A = e(H_1(id_B), s_A), \text{ or}$$

$$K_A = e(s_B, H_1(id_A)),$$

and wherein the bilinear pairing operation to generate the second session key comprises the other of the expressions, and in which e( ) is the bilinear pairing operation, $H_1$( ) is the map-to-point hash, $id_A$ and $id_B$ are each one of the first node identifier and the second node identifier, and $s_A$ and $s_B$ are each one of the first secret point and the second secret point.

3. The method claimed in claim 1, wherein confirming comprises sending a challenge from the first node to the second node encrypted with the first session key, receiving a response to the challenge, and, based on the response, determining that the second node validly decrypted the challenge using the second session key.

4. The method claimed in claim 1, wherein sending further includes sending a first nonce, and wherein receiving further includes receiving a second nonce and a calculated $C_0$ value, wherein the calculated $C_0$ value comprises a hash of a concatenation of the second session key, the first nonce, and the second nonce.

5. The method claimed in claim 4, wherein the concatenation further includes the first node identifier and the second node identifier.

6. The method claimed in claim 4, wherein generating includes generating a calculated $C_1$ value that comprises the hash of a concatenation of the first session key, the first nonce, and the second nonce, and wherein confirming comprises confirming that the calculated $C_0$ value matches the calculated $C_1$ value.

7. The method claimed in claim 1, wherein the second secret point is the group private key times the map-to-point hash of the second node identifier.

8. The method claimed in claim 1, wherein the first secret point and the second secret point are each provided by the group of nodes to the first node and second node, respectively, using secret sharing.

9. A first node comprising:
a processor;
memory;
a network interface; and
a blockchain application containing processor-executable instructions to establish a trusted communication with a second node, the second node having a second node identifier and a second secret point, the second secret point being a group private key times a map-to-point hash of the second node identifier, the group private key being associated with a group of nodes configured to grant credentials, wherein, when executed, the processor-executable instructions cause the first node to:
obtain a first secret point from the group of nodes by at least obtaining, from each of a plurality of nodes in the group of nodes, respective portions of the first secret point and combining the respective portions to form the first secret point without reconstructing the group private key, wherein the first secret point is the group private key times a map-to-point hash of a first node identifier;
send the first node identifier to the second node;
receive the second node identifier;
generate a first session key using a bilinear pairing operation with a map-to-point hash of the second node identifier and with the first secret point; and
confirm that the first session key matches a second session key generated by the second node using the bilinear pairing operation with the second secret point and with a map-to-point hash of the first node identifier.

10. The first node claimed in claim 9, wherein the bilinear pairing operation to generate first session key comprises one of the expressions:

$K_A = e(H_1(id_B), s_A)$, or $K_A = e(s_B, H_1(id_A))$, and wherein the bilinear pairing operation to generate the second session key comprises the other of the expressions, and in which $e(\ )$ is the bilinear pairing operation, $H_1(\ )$ is the map-to-point hash, $id_A$ and $id_B$ are each one of the first node identifier and the second node identifier, and $s_A$ and $s_B$ are each one of the first secret point and the second secret point.

11. The first node claimed in claim 9, wherein the processor-executable instructions, when executed, cause the first node to confirm by sending a challenge from the first node to the second node encrypted with the first session key, receiving a response to the challenge, and, based on the response, determining that the second node validly decrypted the challenge using the second session key.

12. The first node claimed in claim 9, wherein the processor-executable instructions, when executed, cause the first node to send by further sending a first nonce, and to receive by further receiving a second nonce and a calculated $C_0$ value, wherein the $C_0$ value comprises a hash of a concatenation of the second session key, the first nonce, and the second nonce.

13. The first node claimed in claim 12, wherein the concatenation further includes the first node identifier and the second node identifier.

14. The first node claimed in claim 12, wherein the processor-executable instructions, when executed, cause the first node to generate by generating a calculated $C_1$ value that comprises the hash of a concatenation of the first session key, the first nonce, and the second nonce, and to confirm by confirming that the calculated $C_0$ value matches the calculated $C_1$ value.

15. The first node claimed in claim 9, wherein the second secret point is the group private key times the map-to-point hash of the second node identifier.

16. The first node claimed in claim 9, wherein the first secret point and the second secret point are each provided by the group of nodes to the first node and second node, respectively, using secret sharing.

17. A non-transitory processor-readable medium storing processor-executable instructions that, when executed by one or more processors, cause the one or more processors to:
obtain a first secret point from the group of nodes by at least obtaining, from each of a plurality of nodes in the group of nodes, respective portions of the first secret point and combining the respective portions to form the first secret point without reconstructing the group private key, wherein the first secret point is the group private key times a map-to-point hash of a first node identifier;
send the first node identifier to the second node;
receive the second node identifier;
generate a first session key using a bilinear pairing operation with a map-to-point hash of the second node identifier and with the first secret point; and
confirm that the first session key matches a second session key generated by the second node using the bilinear pairing operation with the second secret point and with a map-to-point hash of the first node identifier.

18. The non-transitory processor-readable medium of claim 17, wherein the processor-executable instructions, when executed, cause the first node to confirm by sending a challenge from the first node to the second node encrypted with the first session key, receiving a response to the challenge, and, based on the response, determining that the second node validly decrypted the challenge using the second session key.

19. The non-transitory processor-readable medium of claim 17, wherein the processor-executable instructions, when executed, cause the first node to send by further sending a first nonce, and to receive by further receiving a second nonce and a calculated $C_0$ value, wherein the $C_0$ value comprises a hash of a concatenation of the second session key, the first nonce, and the second nonce.

20. The non-transitory processor-readable medium of claim 17, wherein the second secret point is the group private key times the map-to-point hash of the second node identifier.

* * * * *